UNITED STATES PATENT OFFICE 2,388,202

PRODUCTION OF CHLORINE DIOXIDE

Eric R. Woodward, New York, N. Y., assignor to The Mathieson Alkali Works, Inc., New York, N. Y., a corporation of Virginia No Drawing. Application June 23, 1943, Serial No. 491,953

3 Claims. (Cl. 23—152)

This invention relates to the production of chlorine dioxide and particularly to improvements in the process for producing chlorine dioxide by the reacting of chlorine gas with an aqueous solution of a water-soluble chlorite.

The invention provides an improved method of reacting chlorine gas with the chlorite solution whereby chlorine dioxide substantially free from unreacted chlorine may be readily and economically produced while avoiding the hazards of handling chlorine dioxide in high concentrations.

The production of chlorine dioxide by reacting chlorine gas with an aqueous solution of a water-soluble chlorite, for instance chlorites of the alkali and alkaline earth metals, is described and claimed in United States Letters Patent No. 2,043,284 to Cunningham and Losch. In order to keep the concentration of the chlorine dioxide produced within safe limits, it is recommended in that patent that the chlorine gas be supplied to the reaction sufficiently diluted with an inert gas, such as nitrogen or air, to produce chlorine dioxide correspondingly diluted. It has been found, however, that chlorine dioxide produced by passing the chlorine-diluent mixture into the chlorite solution is frequently contaminated by unreacted chlorine.

In certain operations in which chlorine dioxide is used, the presence of even small amounts of elemental chlorine as a contaminant has been found highly objectionable. United States Letters Patent No. 2,131,447 to Logan discloses a method of carrying out this reaction whereby chlorine-free chlorine dioxide may be safely produced. In accordance with the method therein described, the chlorine gas is caused to react with the chlorite solution in one vessel and the reaction solution transferred to a separate vessel or stripping tower wherein the chlorine dioxide is stripped from the solution by blowing with an inert gas.

The production of chlorine dioxide, in accordance with the latter patent, has presented several economical disadvantages in commercial practice, particularly with respect to the initial cost and the maintenance of the separate reactor and stripping tower and the initial cost and the maintenance of the pump or other apparatus for transferring the corrosive solution from the reaction chamber to the stripping tower.

By my present invention, the use of separate reaction and stripping chambers and means for transferring the corrosive solution from one to the other is avoided without sacrifice of purity of the product and without incurring industrial hazards.

I have discovered that, under the hereinafter prescribed conditions, the reaction of chlorine gas with the chlorite solution to form chlorine dioxide and the stripping of the thus formed chlorine dioxide from the solution may be accomplished in a single operation while avoiding contamination of the chlorine dioxide product by unreacted chlorine gas.

In accordance with my improved process, chlorine and the inert gas in measured quantities are separately introduced into the chlorite brine, preferably, but not necessarily, into the lower portion of a vertically elongated column of the chlorite brine, for instance in a vertically elongated chamber or tower flooded with the brine. The inert gas such as air or nitrogen, is with advantage introduced into a zone of the column of liquid above the zone to which the chlorine gas is introduced.

By the separate introduction of the chlorine gas and inert gas, in accordance with my present invention, as distinguished from the admixing of the gases prior to introduction, the chlorine is initially brought into contact with the brine undiluted by the inert gas.

The successful operation of my improved process is not dependent upon a valid explanation of the principles upon which it operates and I do not intended to be bound to any theory as to why the improved results are thereby obtained. However, it is my present belief that when chlorine and the diluent gas are injected in admixture into the brine, the chlorine gas is in a way isolated from the solution by the diluent gas and is carried upwardly and out of the solution by the bubbles of diluent gas without adequate contact with the chlorite solution. When relatively undiluted chlorine gas is injected into the brine in accordance with my present invention, the bubbles thereof are substantially completely soluble in the solution and consequently no constituent thereof remains to isolate the inner portion of the bubble from the solution. However, where the bubbles comprise a mixture of chlorine and inert gas, the inert gas constituent is relatively insoluble in the solution and the bubble thereof persists, and a portion of the chlorine gas is thereby carried upwardly and out of the solution effectively isolated from the solution by the inert gas.

The chlorine and the inert gas are advantageously introduced into the solution in a relatively finely dispersed state. This is particularly advantageous with respect to the chlorine gas, as the reaction thereof with the chlorite brine is thereby expedited and the escape of minor proportions of unreacted chlorine gas from the surface of the liquid is less likely to occur, even at high operating rates. Under such conditions, the path of the chlorine gas through the brine may be relatively shortened as the reaction is practically instantaneous. Also, by finely dispersing the inert gas in the solution, the stripping action is expedited.

The invention is with advantage carried out in a vertically elongated cylindrical chamber or tower fabricated of corrosion-resistant material and partially filled with the brine. By providing a body of liquid of considerable depth, completed reaction of the chlorine with the brine is assured and stripping is facilitated. As a precaution against the escape of unreacted chlorine gas from the surface of the liquid, the depth of the body of brine may be substantially greater than the height to which bubbles of chlorine gas will rise before complete reaction. The minimum depth will depend on the rate at which the chlorine gas is supplied and the degree of dispersion. For a given depth of liquid, the operating rate may readily be determined by analysis of the product for the presence of unreacted chlorine.

As previously stated, the air or other inert gas is advantageously introduced into the body of liquid in an intermediate zone near the lower end of the liquid column but above the zone of introduction of the chlorine gas. When so introduced, an opportunity is afforded the chlorine to react with the brine in the absence of any diluent. However, satisfactory results have been obtained where diluent air is introduced in a zone below that of the chlorine introduction. Also, the lower portion of the column of brine may with advantage be packed with a suitable packing, such as ¼" saddle packing, so as to obtain more intimate and prolonged contact between the chlorine gas and the brine.

Since the materials to be handled are highly corrosive, it is desirable that all parts of the apparatus in contact therewith be fabricated of corrosion-resisting material such as glass or stoneware or otherwise be protected by a lining or covering of a suitable corrosion-resistant metal or alloy.

The chlorine gas may be injected into the brine through a porous cylinder of a clay-like material so as to effect a high degree of dispersion of the chlorine gas in the liquid. The air may be similarly introduced.

I have obtained excellent results in a simple type of apparatus comprising a vertically elongated cylindrical chamber or tower lined with a glass-like material of low coefficient of expansion such as is marketed under the trade name "Vitreosil," and provided with two silver tubes, each ⅝" in diameter, projecting downwardly through and terminating within the liquid near the lower end of the tower. Air in measured quantities was injected through one of these tubes and chlorine gas through the other. The tube through which the air was admitted projected slightly below the lower end of the chlorine tube. Neither tube was provided with special means for finely dispersing the gases in the liquid. In the upward passage of these gases through the chlorite brine, the chlorine gas reacts with the brine to form chlorine dioxide and the air strips the thus-formed chlorine dioxide from the brine. The admixture of chlorine dioxide and air, substantially free from unreacted chlorine gas, passes from the chamber through an exit provided in the upper end thereof.

In accordance with my improved process, the chlorine gas reacts completely with the chlorite of the brine to form chlorine dioxide gas, which, by means of the air or other inert gas, is stripped from the body of the liquid in the tower substantially free from unreacted chlorine and a safe concentration of chlorine dioxide is maintained.

It is well known that chlorine dioxide in admixture with air forms explosive mixtures. While in my process any inert gas, such as, for example, nitrogen, may be used to sweep the chlorine dioxide from the solution, because of economic reasons, air is usually preferred. The proportions of air and chlorine gas may be varied to some extent. However, to avoid possible explosion, it is important that high concentrations of the chlorine dioxide product be avoided. Experimental results show that, where air is used as the inert gas, it is desirable that it be used in sufficient quantities to maintain the partial pressure of the chlorine dioxide in the effluent gases below about 30 mm. of mercury to assure safe operation.

As an illustration of my improved process, I have dissolved 21 pounds of sodium chlorite in 10 gallons of water and placed this in a tower similar to that herein described. Air was injected into the brine at the rate of 120 cubic feet per hour and concurrently therewith chlorine gas was passed into the brine at the rate of approximately 20 grams per hour. In this operation chlorine dioxide was evolved at the rate of 37 grams per hour, and careful analysis indicated the chlorine dioxide product to be free from elemental chlorine.

In another operation, using the same apparatus and a chlorite brine consisting of 21 pounds of sodium chlorite in 10 gallons of water, air was passed into the brine at the rate of 120 cubic feet per hour and chlorine gas was supplied at the rate of about 11 grams per hour. The product, consisting of an admixture of chlorine dioxide and air, was obtained at the rate equivalent to 20.5 grams of chlorine dioxide per hour and an analysis showed the product to be free from elemental chlorine.

The operation described herein may be carried out as a single unit or a plurality of similar units may be connected in parallel so as to assure continuous production of chlorine dioxide in the required amounts.

I claim:

1. In the process for producing chlorine dioxide wherein chlorine gas is reacted in a reaction zone with an aqueous solution of a water-soluble chlorite to form the chlorine dioxide and the thus-formed chlorine dioxide is stripped from the solution in the reaction zone by the bubbling of an inert gas through the solution and passed from the reaction zone in admixture with the inert gas, the improvement which comprises separately and concurrently injecting the chlorine gas and the inert gas into a single body of the aqueous chlorite solution in the reaction zone.

2. In the process for producing chlorine dioxide wherein chlorine gas is reacted in a reaction zone with an aqueous solution of a water-soluble chlorite to form the chlorine dioxide and the thus-formed chlorine dioxide is stripped from the solution in the reaction zone by the bubbling of an inert gas through the solution and passed from the reaction zone in admixture with the inert gas, the improvement which comprises separately and concurrently injecting the chlorine gas and air into a single body of the aqueous chlorite solution in the reaction zone.

3. In the process for producing chlorine dioxide wherein chlorine gas is reacted in a reaction zone with an aqueous solution of a water-soluble chlorite to form the chlorine dioxide and the thus-formed chlorine dioxide is stripped from the solution in the reaction zone by the bubbling of an inert gas through the solution and passed from the reaction zone in admixture with the inert gas, the improvement which comprises injecting chlorine gas into a single body of the aqueous chlorite solution in the reaction zone and separately and concurrently injecting air into a portion of the single body of said solution in the reaction zone above the portion thereof to which the chlorine gas is introduced.

ERIC R. WOODWARD.